United States Patent
Kotoku (10) Patent No.: US 12,437,376 B2
(45) Date of Patent: Oct. 7, 2025

(54) IMAGE CAPTURING APPARATUS AND CONTROL METHOD THEREOF, AND STORAGE MEDIUM

(71) Applicant: CANON KABUSHIKI KAISHA, Tokyo (JP)

(72) Inventor: Hiromi Kotoku, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 18/463,719

(22) Filed: Sep. 8, 2023

(65) Prior Publication Data
US 2024/0095892 A1 Mar. 21, 2024

(30) Foreign Application Priority Data
Sep. 20, 2022 (JP) ................. 2022-149544

(51) Int. Cl.
*G06T 5/80* (2024.01)
*G06T 7/70* (2017.01)
*H04N 23/68* (2023.01)

(52) U.S. Cl.
CPC ............ *G06T 5/80* (2024.01); *G06T 7/70* (2017.01); *H04N 23/6812* (2023.01); *H04N 23/685* (2023.01)

(58) Field of Classification Search
CPC ........... G06T 5/20; G06T 7/70; H04N 23/687; H04N 5/2325; H04N 23/6812
See application file for complete search history.

(56) References Cited

U.S. PATENT DOCUMENTS

| | | | |
|---|---|---|---|
| 2009/0225176 A1* | 9/2009 | Honjo | G03B 5/02 348/E5.022 |
| 2015/0085149 A1* | 3/2015 | Tsubaki | H04N 23/6812 348/208.4 |
| 2016/0269637 A1* | 9/2016 | Shibata | H04N 23/6812 |
| 2018/0173079 A1* | 6/2018 | Wakamatsu | G03B 5/00 |

FOREIGN PATENT DOCUMENTS

JP 2016-157067 A 9/2016

* cited by examiner

*Primary Examiner* — Xi Wang
(74) *Attorney, Agent, or Firm* — Cowan, Liebowitz & Latman, P.C.

(57) ABSTRACT

An image capturing apparatus operable to obtain an image by capturing a subject image includes an orientation angle calculation unit configured to calculate an orientation angle of the image capturing apparatus, and a correction unit configured to perform correction based on the orientation angle of the image capturing apparatus so as to maintain a levelness of the image. The orientation angle calculation unit changes a method of calculating the orientation angle between a first state in which walking moving image capturing is performed with a vibration suppression mechanism configured to suppress a vibration of the image capturing apparatus attached to the image capturing apparatus and a second state other than the first state.

16 Claims, 7 Drawing Sheets

| VIBRATION STATE | Gain1(Acc) | Gain2(Gyr) |
|---|---|---|
| LARGE | 0.2 | 0.8 |
| SMALL | 0.9 | 0.1 |

| IMAGE CAPTURING STATE | CHANGE IN ACCELERATION | CHANGE IN ANGULAR VELOCITY |
|---|---|---|
| CAPTURE MOVING IMAGE WHILE STILL WITH STABILIZER ATTACHED | SMALL | SMALL |
| CAPTURE MOVING IMAGE WHILE WALKING WITHOUT STABILIZER ATTACHED | LARGE | LARGE |
| CAPTURE MOVING IMAGE WHILE WALKING WITH STABILIZER ATTACHED | LARGE | SMALL |

FIG. 7

IMAGE CAPTURING APPARATUS AND CONTROL METHOD THEREOF, AND STORAGE MEDIUM

BACKGROUND OF THE INVENTION

Field of the Invention

The present invention relates to an image leveling technology in image capturing apparatuses.

Description of the Related Art

In recent years, various image leveling functions for correcting an image so as to maintain its levelness even when an image capturing apparatus, such as a digital camera or a video camera, captures the image in a tilted state has been proposed. By providing such a leveling function in image capturing apparatuses, it is possible to capture images with better composition.

As such a leveling function in image capturing apparatuses, a configuration in which an acceleration sensor for detecting gravitational acceleration in the image capturing apparatus is provided and, using the value of that acceleration sensor, an orientation angle of the image capturing apparatus is calculated is known. However, in this technique, the angle of the image capturing apparatus is erroneously calculated when hand-shake is large because acceleration due to shake is added to the gravitational acceleration, and as a result, there is a possibility that leveling accuracy does not stabilize and an image that is not desired by the user is captured.

Japanese Patent Laid-Open No. 2016-157067 discloses a technique in which an angular velocity sensor is provided in addition to the acceleration sensor and a weighting of acceleration and a weighting of angular velocity when calculating the angle are changed according to vibration of the image capturing apparatus. Thus, even if hand-shake occurs due to the image capturing apparatus being handheld, it is possible to stably realize image leveling without the leveling feeling unnatural to the user.

Incidentally, in recent years, cases where, when capturing a moving image while walking, in order to reduce shake in the image capturing apparatus, a moving image is captured with an electric gimbal stabilizer (hereinafter, referred to as stabilizer) is attached to the image capturing apparatus are increasing.

Although there is a large acceleration due to vibration of the entire image capturing apparatus when capturing images while walking using a stabilizer, the vibration is suppressed in the image capturing apparatus main body due to the effect of the stabilizer. However, many of the stabilizers attempt to stabilize an image by correcting shake with respect to generated angular velocity, and the movement of the image capturing apparatus main body due to gravitational acceleration is often suppressed by the rigidity of the stabilizer. Therefore, although the movement of the image capturing apparatus main body due to gravitational acceleration is suppressed, gravitational acceleration itself of the image capturing apparatus main body continues. That is, gravitational acceleration of the image capturing apparatus main body is relatively greater than angular velocity.

As a result, in a case of a configuration in which leveling processing is performed using an angle calculated from gravitational acceleration and angular velocity, when the image capturing apparatus is mounted to the stabilizer, orientation angle information is erroneously calculated due to the relative difference between gravitational acceleration and angular velocity. Therefore, when the image capturing apparatus is mounted to the stabilizer, the leveling accuracy does not stabilize, and there may be cases where an image that is not intended by the user is captured.

SUMMARY OF THE INVENTION

The present invention has been made in view of the above-described problems and provides an image capturing apparatus capable of capturing a good image in which the levelness of the image is maintained even when capturing a moving image with a stabilizer attached.

According to a first aspect of the present invention, there is provided an image capturing apparatus operable to obtain an image by capturing a subject image, the apparatus comprising: at least one processor or circuit configured to function as: an orientation angle calculation unit configured to calculate an orientation angle of the image capturing apparatus; and a correction unit configured to perform correction based on the orientation angle of the image capturing apparatus so as to maintain a levelness of the image, wherein the orientation angle calculation unit changes a method of calculating the orientation angle between a first state in which walking moving image capturing is performed with a vibration suppression mechanism configured to suppress a vibration of the image capturing apparatus attached to the image capturing apparatus and a second state other than the first state.

According to a second aspect of the present invention, there is provided a method of controlling an image capturing apparatus operable to obtain an image by capturing a subject image, the method comprising: calculating an orientation angle of the image capturing apparatus; and performing correction based on the orientation angle of the image capturing apparatus so as to maintain a levelness of the image, wherein in the calculating of the orientation angle, a method of calculating the orientation angle is changed between a first state in which walking moving image capturing is performed with a vibration suppression mechanism configured to suppress a vibration of the image capturing apparatus attached to the image capturing apparatus and a second state other than the first state.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
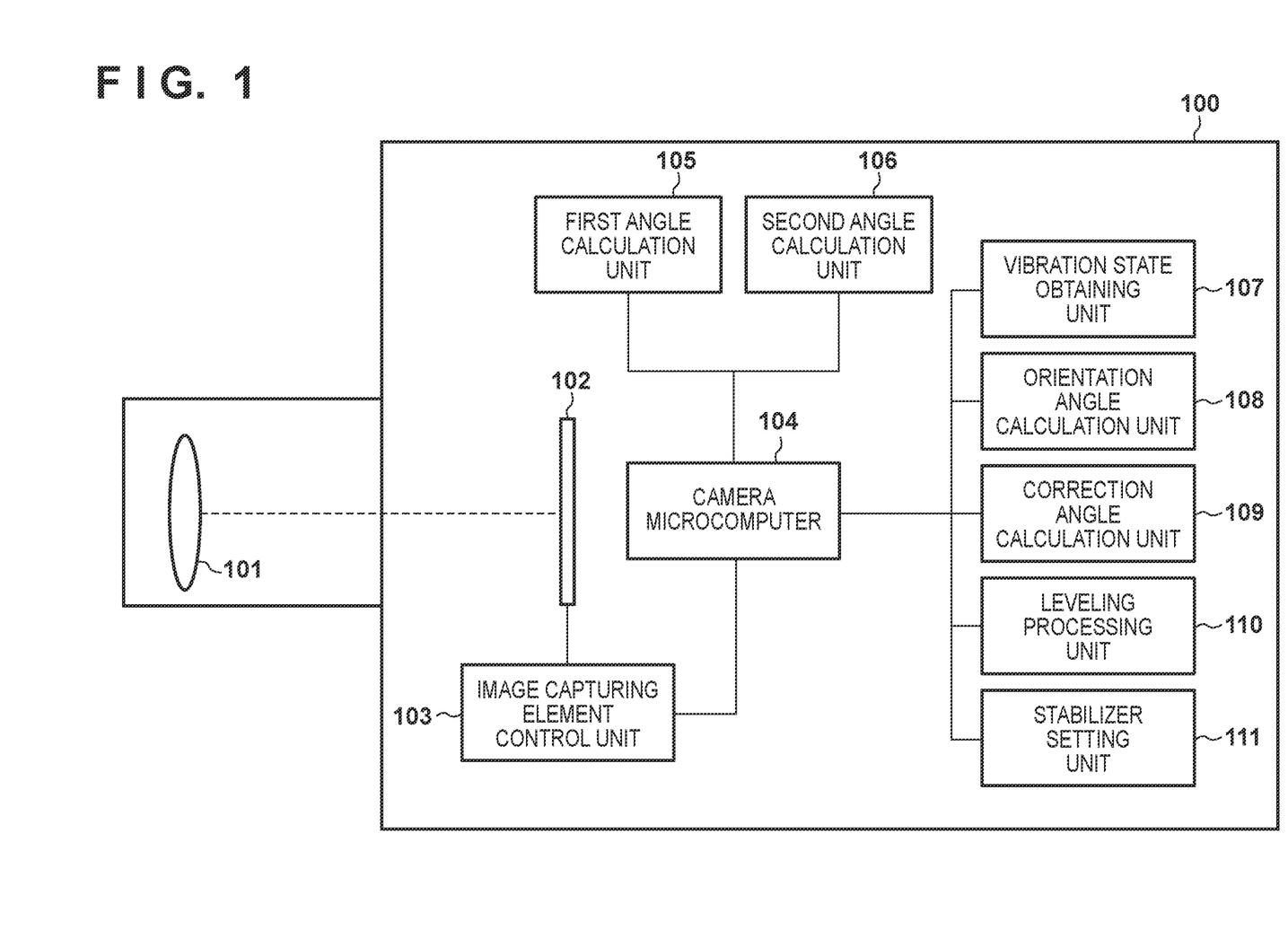
FIG. 1 is a block diagram illustrating a schematic configuration of an image capturing apparatus according to a first embodiment.

FIG. 1 illustrates a configuration of a digital camera (hereinafter, referred to as camera) 100, which is a first embodiment of an image capturing apparatus of the present invention. The camera 100 may be a still camera or a video camera. In addition, in the present embodiment, the camera 100 is illustrated as a lens-integrated camera but may be a lens-interchangeable camera.

In the camera 100, an image capturing element control unit 103 captures (performs photoelectric conversion of) a subject image formed by the image capturing optical system 101, using an image capturing element 102.

A camera microcomputer 104 includes components, such as a CPU, a ROM, and a RAM and a communication bus, therein and controls the respective units of the camera 100.

A first angle calculation unit 105 detects gravitational acceleration (obtains acceleration information) of the camera 100, converts the gravitational acceleration into an acceleration signal, and calculates an angle (hereinafter, referred to as first angle information) from that signal. In the present embodiment, description will be given assuming that an MEMS sensor, which is capable of detecting gravitational acceleration in three directions, which are the X-axis, the Y-axis, and the Z-axis, and outputting an acceleration signal is used.

A second angle calculation unit 106 detects angular velocity (obtains angular velocity information) of the camera 100, converts the angular velocity acceleration into an angular velocity signal, and calculates an angle (hereinafter, referred to as second angle information) from that signal. In the present embodiment, description will be given assuming that a gyro sensor is used.

A vibration state obtaining unit 107 obtains the state of vibration of the camera 100 from the second angle information. In the present embodiment, an example in which the presence or absence of vibration is determined using the magnitude of the second angle information will be described; however, the present invention is not limited to this. For example, the determination may be made from the first angle information or the determination may be made from angle information obtained by combining the first angle information and the second angle information.

An orientation angle calculation unit 108 calculates orientation angle information of the camera 100 based on the first angle information and the second angle information. When calculating the orientation angle information, the orientation angle calculation unit 108 can use a plurality of calculation modes (a stabilizer attached mode and a normal mode) and can dynamically change between these calculation modes.

A correction angle calculation unit 109 calculates correction angle information for correcting the orientation of the camera 100 based on the first angle information and the second angle information. When calculating the correction angle information, the correction angle calculation unit 109 can use a plurality of calculation modes (a stabilizer attached mode and a normal mode) and can dynamically change between these calculation modes.

In the present embodiment, an example in which the orientation angle and the correction angle of the camera 100 are each calculated by a different means is described; however, the present invention is not limited to this. For example, a configuration may be taken so as to calculate only the orientation angle and decide the correction angle such that the orientation angle will be a certain constant value.

A leveling processing unit 110 performs correction processing for maintaining the levelness of an image based on the orientation angle information of the camera 100 obtained by the orientation angle calculation unit 108. The leveling processing may employ, for example, a method in which, by rotating or moving the image capturing element 102 with respect to the optical axis of the image capturing optical system, the levelness of an obtained image itself is maintained. In addition, a method in which, by converting an image obtained by the image capturing element 102 by geometric deformation in an image processing unit, the levelness is maintained may be employed. The method need only be a method by which the levelness of an image can be maintained in a broad sense and is not limited to the method exemplified in the present embodiment.

A stabilizer setting unit 111 sets, according to the user's operation, whether walking moving image capturing has been started in a state in which the camera 100 is mounted to an electric gimbal stabilizer (vibration suppression mechanism; hereinafter, referred to as stabilizer) (not illustrated) and notifies the camera microcomputer 104 of that information. This setting processing may be performed using a user interface provided in the camera microcomputer 104, or a button for the setting may be provided in the camera 100.

Figure 2A:
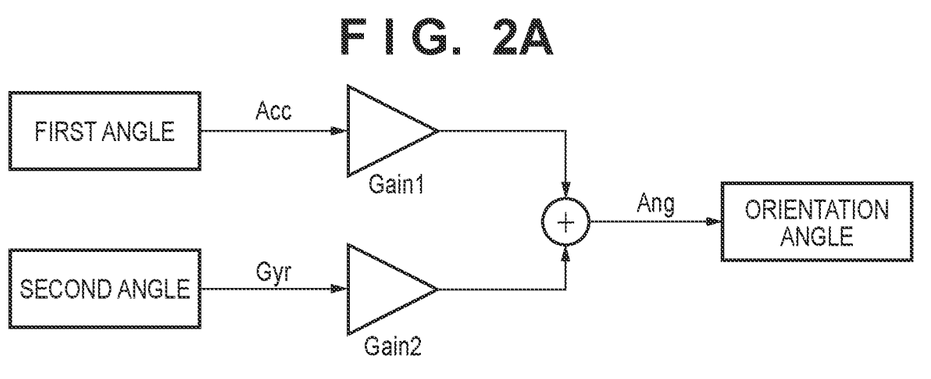
FIGS. 2A and 2B are diagrams illustrating an example of orientation angle calculation according to the first embodiment.
Figure 2B:
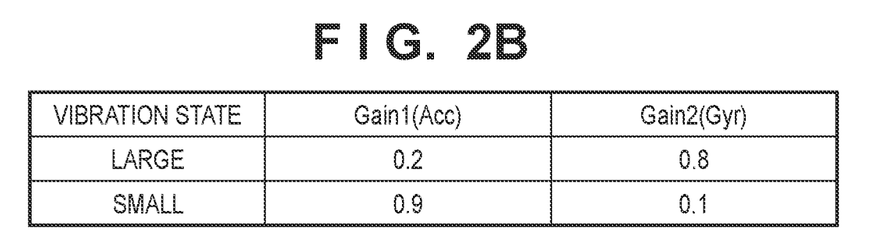

Next, FIGS. 2A and 2B are diagrams illustrating an example of a normal mode, which is used in normal times, among the orientation angle calculation modes that can be switched in the orientation angle calculation unit 108. This normal mode is used when a stabilizer is not attached to the camera 100 or even when a stabilizer is attached, when walking moving image capturing is not being performed (a second state other than a first state, which will be described later).

The orientation angle calculation unit 108 calculates an orientation angle Ang by combining a first angle Acc obtained by the first angle calculation unit 105 and a second angle Gyr obtained by the second angle calculation unit 106 at a predetermined combination ratio as illustrated in FIG. 2A. Specifically, the orientation angle calculation unit 108 calculates the orientation angle Ang from the following equation, using a weighted gain table, such as the one illustrated in FIG. 2B, which is stored in advance in the camera microcomputer 104.

$$Ang = Acc*Gain1 + Gyr*Gain2$$

At this time, it is desirable that the camera microcomputer 104 appropriately adjusts the gain table, as illustrated in FIG. 2B, according to the vibration state obtained by the vibration state obtaining unit 107. For example, if the vibration state is determined to be small, it is considered that the camera 100 is in a static state and the first angle Acc is a more accurate angle; thus, it is advantageous to increase the weight Gain1 to be applied to the first angle. In addition, if the vibration state is determined to be large, it is considered that the camera 100 is in a hand-shake state and the second angle Gyr is a more accurate angle; thus, it is advantageous to increase the weight Gain2 to be applied to the second angle.

In the present embodiment, a configuration in which two types of gain settings (large and small vibration states) are provided and switched is described; however, the present invention is not limited to this. For example, a configuration may be taken so as to provide three or more types of gain settings and perform switching in a multi-stage configuration.

In addition, in the present embodiment, an example in which a non-zero value is set to each of Gain1 and Gain2 in the calculation of the orientation angle is described; however, the present invention is not limited to this. For example, a configuration may be taken so as to perform setting such that Gain1=1.0 and Gain2=0 so as to use only the first angle, or a configuration may be taken so as to perform setting such that Gain1=0 and Gain2=1.0 so as to use only the second angle.

In the above, orientation angle calculation by the orientation angle calculation unit 108 has been described; however, correction angle calculation by the correction angle calculation unit 109 may be performed in a similar manner.

Figure 3:
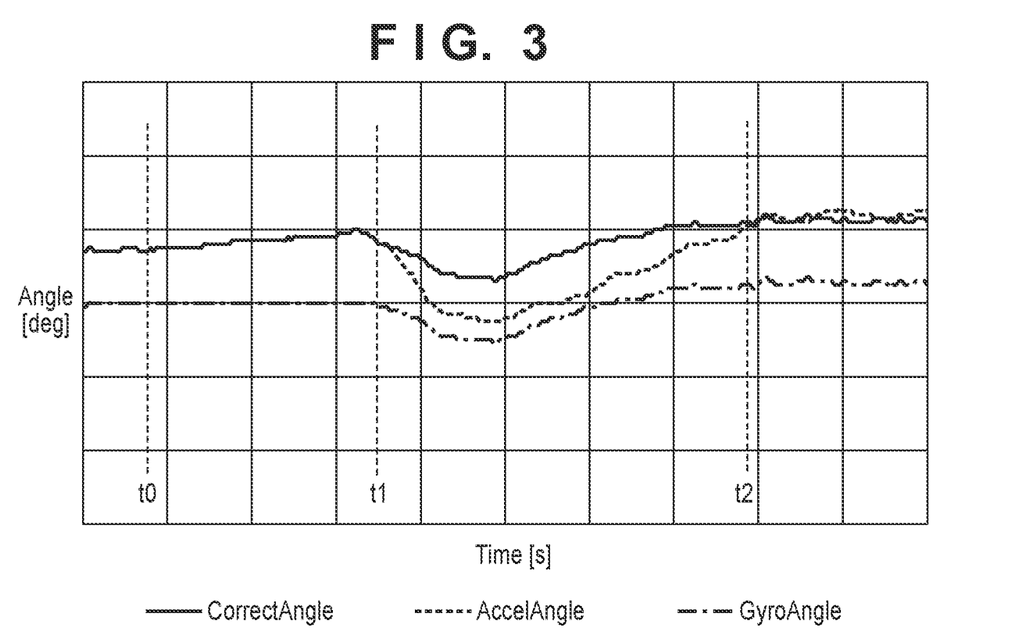
FIG. 3 is a diagram illustrating an example of orientation angle calculation in a stabilizer attached mode according to the first embodiment.

FIG. 3 is a diagram illustrating a stabilizer attached mode, which can be set in the orientation angle calculation unit 108 and used in a stabilizer attached state. In this diagram, a situation in which, at time t1 at which the user starts walking moving image capturing, a change is made from the normal mode to the stabilizer attached mode is illustrated. The switch from the normal mode to the stabilizer attached mode is performed when the stabilizer is attached and walking moving image capturing is started (a first state), according to the user's operation on the stabilizer setting unit 111.

AccelAngle of FIG. 3 indicates the first angle calculated by the first angle calculation unit 105. In addition, GyroAngle indicates the second angle calculated by the second angle calculation unit 106. Furthermore, CorrectAngle indicates the orientation angle calculated by the orientation angle calculation unit 108. In addition, time t0 indicates the timing at which the camera 100 is static after the stabilizer has been attached, time t1 indicates the timing at walking moving image capturing is started—that is, the timing at which walking is started, and time t2 indicates the timing at which the walking has stabilized.

In a period from time t0 to time t1, the orientation angle is calculated using the orientation angle calculation mode (normal mode) in which weight is placed on the first angle, because the camera 100 is in a static state. In this state, when walking is started at time t1, gravitational acceleration of the camera 100 due to the vibration caused by walking, and the calculated first angle deviates from the actual orientation angle of the camera 100. At this time, since the angular velocity of the camera 100 (movement of the camera) is suppressed by the stabilizer, it is determined by the vibration state obtaining unit 107 that the vibration state is small. For example, when it is determined that the camera 100 is in a static state based on the determination that the vibration state is small, in the normal mode the orientation angle calculation in which weight is placed on the first angle, which deviates from the actual orientation angle, is performed. Therefore, as a result, the image leveling accuracy deteriorates.

In order to address this issue, in the present embodiment, at time t1, by notifying the camera microcomputer 104 of the start of walking moving image capturing according to the user's operation on the stabilizer setting unit 111, the angle calculation modes of the orientation angle calculation unit 108 are switched. Specifically, the mode is switched from the normal mode in which weight is placed on the first angle to the aforementioned stabilizer attached mode. In the stabilizer attached mode, calculation is performed by increasing the weight of the second angle compared to the normal mode; however, in order to guarantee the continuity of the orientation angle, it is desirable that the orientation angle and the second angle at time t1 are provided as offset components and the calculation is performed by adding the difference in the second angle from time t1 as follows.

$$Ang(t)=Acc(t1)+\{Gyr(t)-Gyr(t1)\}$$

However, in a broad sense, the weights for when calculating the orientation angle may be switched according to whether the stabilizer is attached and walking image capturing is performed; thus, the present invention is not limited to this calculation method.

As described above, by changing the orientation angle calculation mode when calculating the orientation angle, optimal image leveling processing is possible even in a situation in which a walking moving image is captured when the stabilizer is attached.

In the present embodiment, an example in which the start of walking moving image capturing is determined according to the user's operation on the stabilizer setting unit 111 and the mode is switched to the stabilizer attached mode is described; however, the present invention is not limited to this. For example, a configuration may be taken such that the stabilizer includes a mechanism for detecting walking and when it is notified from the stabilizer that the camera 100 is in a walking state by a communication means, the orientation angle calculation method is switched to the stabilizer attached mode. The method need only be a method of switching to the stabilizer attached mode in a broad sense, and the present invention is not limited to the technique exemplified in the present embodiment.

Figure 4:
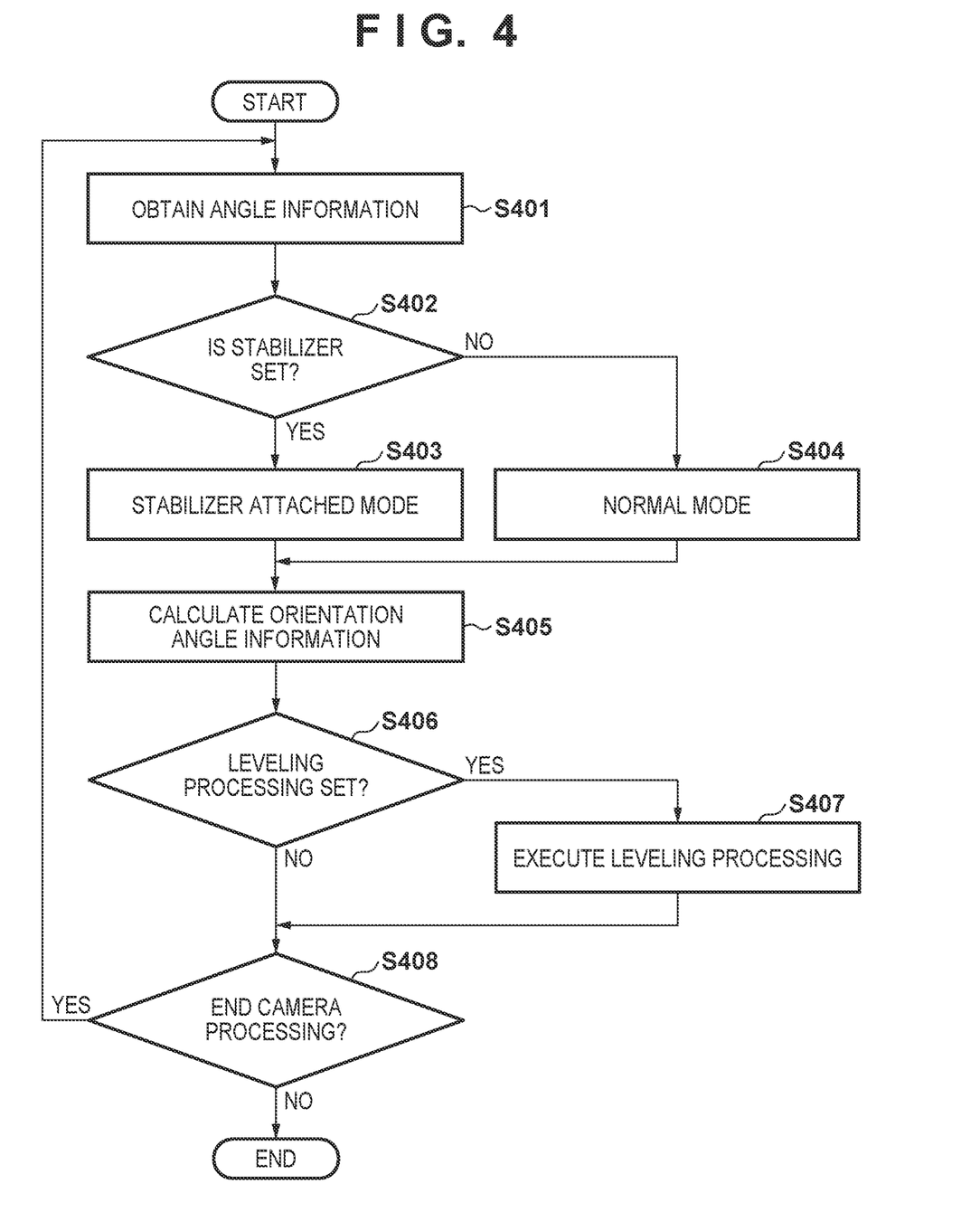
FIG. 4 is a flowchart for explaining the operation of leveling processing according to the first embodiment.

Next, the operation of leveling processing according to the present embodiment will be described with reference to a flowchart indicated in FIG. 4.

When the camera 100 is powered on and the control of the camera 100 is started, in step S401, the camera microcomputer 104 obtains the first angle and the second angle using the first angle calculation unit 105 and the second angle calculation unit 106.

In step S402, the camera microcomputer 104 determines whether the setting of the stabilizer setting unit 111 is set to a state in which the stabilizer is attached and a walking moving image is being captured. When it is determined that a walking moving image is being captured with the stabilizer attached, the camera microcomputer 104 advances the processing to step S403; otherwise, the camera microcomputer 104 advances the processing to step S404.

In step S403, the camera microcomputer 104 sets the orientation angle calculation mode of the orientation angle calculation unit 108 to the stabilizer attached mode. The stabilizer attached mode corresponds to an orientation angle calculation algorithm for when a walking moving image is being captured with the stabilizer attached to the camera 100, as from time t1 onward in FIG. 3.

In step S404, the camera microcomputer 104 sets the angle calculation mode of the orientation angle calculation unit 108 to the normal mode. The normal mode corresponds to an orientation angle calculation algorithm for when the stabilizer is not attached to the camera 100 or even when the stabilizer is mounted, when a walking moving image is not being captured, as illustrated in FIGS. 2A and 2B.

In step S405, the camera microcomputer 104 calculates the orientation angle of the camera 100 based on the operation mode set in step S403 or step S404, using the orientation angle calculation unit 108.

In step S406, the camera microcomputer 104 determines whether the setting for executing the leveling processing is made. When it is determined that the setting for executing the leveling processing is made, the camera microcomputer 104 advances the processing to step S407; otherwise, the camera microcomputer 104 advances the processing to step S408.

In step S407, the camera microcomputer 104 performs leveling of an image using the leveling processing unit 110. The camera microcomputer 104 instructs the image capturing element control unit 105 to offset the angle using the orientation angle information of the camera 100 obtained by the orientation angle calculation unit 108. The image capturing element control unit 105 maintains the levelness of the image by rotating the image capturing element 104 based on the instruction.

In the present embodiment, an example in which it is determined whether to execute the leveling processing according to leveling processing execution that is set in the camera microcomputer 104 is described; however, the present invention is not limited to this. For example, if the setting of the stabilizer setting unit 111 is a setting in which a walking moving image is being captured with the camera 100 mounted on the stabilizer, the camera microcomputer 104 may decide not to perform image leveling processing.

In step S408, the camera microcomputer 104 determines whether to terminate the camera operation. When continuing the camera operation, the camera microcomputer 104 returns the processing to step S401 and continuously performs the processing of step S401 to step S408. When terminating the camera operation, the operation of this flow is terminated.

As described above, according to the above-described first embodiment, even if the user uses the stabilizer in order to capture a walking moving image, it is possible to capture a good image in which the levelness of the image is maintained.

In the present embodiment, a case in which a user sets that a stabilizer is attached is described as an example; however, the present invention is not limited to this. For example, a configuration may be taken such that the camera 100 includes a communication unit for communicating with a stabilizer and determines whether a stabilizer is attached by transmitting and receiving data when the stabilizer is attached. The method need only be a method by which it can be determined that the stabilizer is attached in a broad sense, and any method may be used.

Second Embodiment

In the first embodiment, it has been described that the image leveling processing is performed by switching from the normal mode to the stabilizer attached mode in conjunction with the user's operation on the stabilizer setting unit 111. However, this configuration is not always optimal in all image capturing scenes. For example, when recording a moving image in which one intermittently repeats walking and stopping, it is necessary to set the stabilizer attached mode to enable/disable each time. In this case, since the procedure to be performed the user becomes complicated, there is a possibility that the moving image recording is continued in a state in which the stabilizer attached mode is not appropriately set due to human setting omission. Therefore, it is more preferable that the switching between the normal mode and the stabilizer attached mode is performed automatically without the user being conscious of it. Therefore, in a second embodiment, an embodiment in which the vibration state of the camera 100 is detected and the switching to the stabilizer attached mode is automatically performed according to the detected vibration state will be described with reference to FIG. 5, FIGS. 6A to 6D, and FIG. 7.

Figure 5:
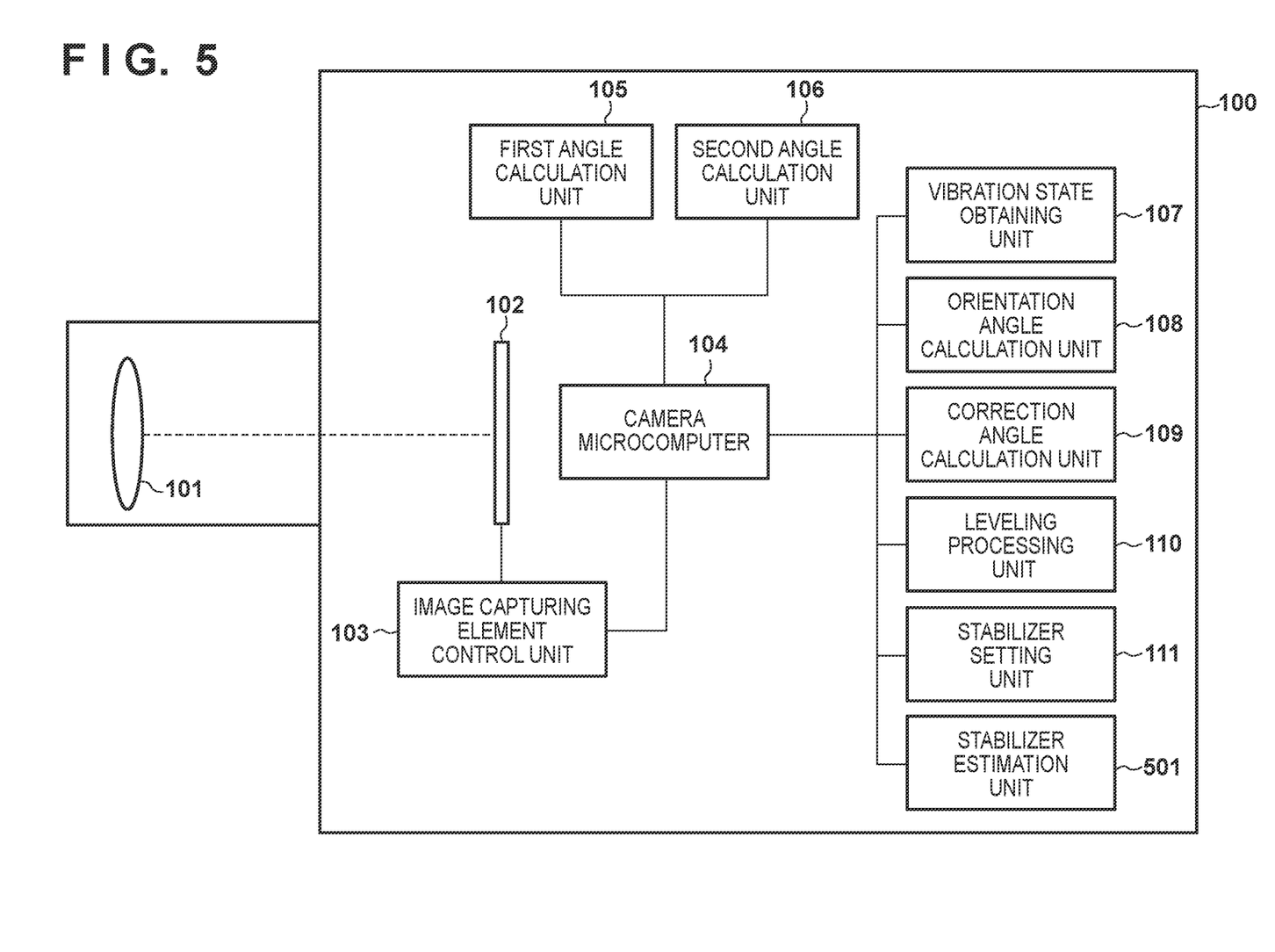
FIG. 5 is a block diagram illustrating a schematic configuration of the image capturing apparatus according to a second embodiment.

In FIG. 5, FIGS. 6A to 6D, and FIG. 7, the same reference numerals will be assigned and description will be omitted for processing contents that are similar to the first embodiment, and only the configurations and processing that are different from the first embodiment will be described. FIG. 5 is a diagram illustrating a configuration of the camera 100 of the second embodiment.

The stabilizer estimation unit 501 estimates whether the stabilizer is attached and the start of capturing of a walking moving image according to the difference between the acceleration signal obtained by the first angle calculation unit 105 and the angular velocity signal obtained by the second angle calculation unit 106. The estimation method may be such that, for example, the difference between the acceleration signal and the angular velocity signal obtained last time and the difference between the acceleration signal and the angular velocity signal obtained this time are each calculated and if a difference therebetween exceeds a certain threshold, it is determined that a walking moving image is being captured with the stabilizer attached. However, the determination algorithm is not limited to the method of performing determination by calculating the difference.

FIGS. 6A to 6D are diagrams illustrating a method of calculating an orientation angle at the time of walking moving image capturing in a state in which a stabilizer is attached according to the present embodiment.

Figure 6A:
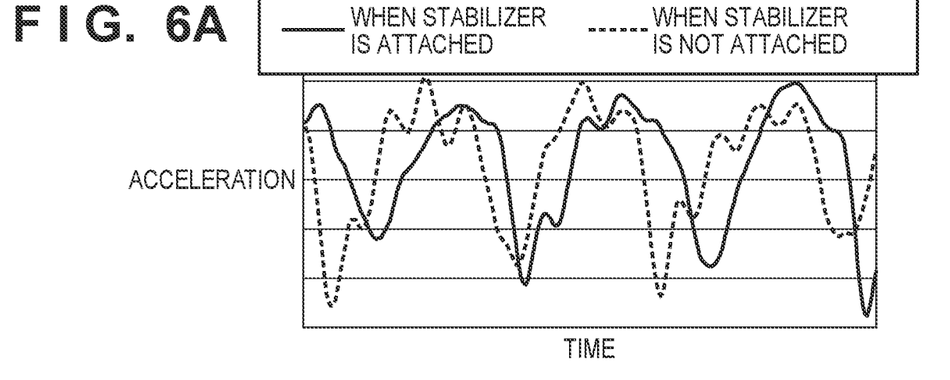
FIGS. 6A to 6D are diagrams illustrating examples of estimating the stabilizer attached mode according to the second embodiment.

FIG. 6A illustrates a change in the acceleration signal in the gravitational direction detected by the first angle calculation unit 105 for when a moving image is captured while walking, when the stabilizer attached to the camera body 100 and when the stabilizer not attached to the camera body 100. When comparing a case where an image is captured with the stabilizer attached to the camera body 100 and a case where the stabilizer is not attached to the camera body 100, no significant difference is observed in the change in the acceleration signal in the gravitational direction of the camera body 100.

Figure 6B:
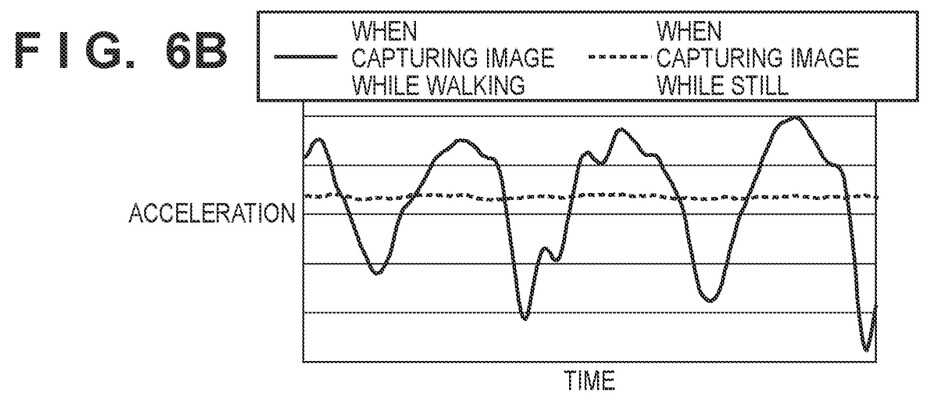

FIG. 6B illustrates a change in the acceleration signal in the gravitational direction when the stabilizer is attached to the camera body 100, for when a moving image is captured while walking and for when a moving image is captured while still. It can be seen that the change in the acceleration signal in the gravitational direction is larger when the moving image is captured while walking than when the moving image is captured while still. This is because, when the moving image is captured while walking, a change occurs in the acceleration in the gravitational direction of the camera body 100 due to the impact of the photographer landing.

Figure 6C:
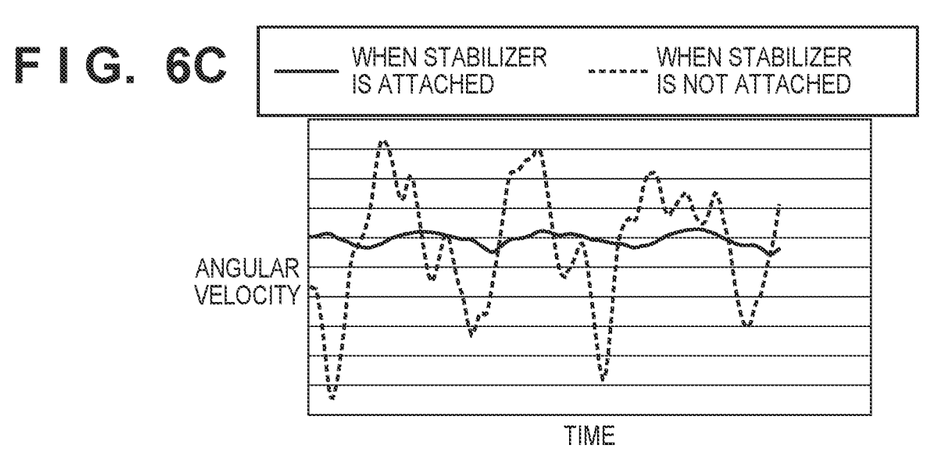

FIG. 6C illustrates a change in the angular velocity signal in the gravitational direction (the angular velocity in a pitch direction of the camera) detected by the second angle calculation unit 106 when a moving image is captured while walking, for when the stabilizer is attached to the camera body 100 and for when the stabilizer is not attached to the camera body 100. It can be seen that, in a case where an image is captured with the stabilizer attached to the camera body 100, the change in the angular velocity signal in the gravitational direction is relatively small compared with a case where the stabilizer is not attached to the camera body 100. This is because the stabilizer detects changes in the angular velocity of the camera body 100 and operates to offset the changes.

Figure 6D:
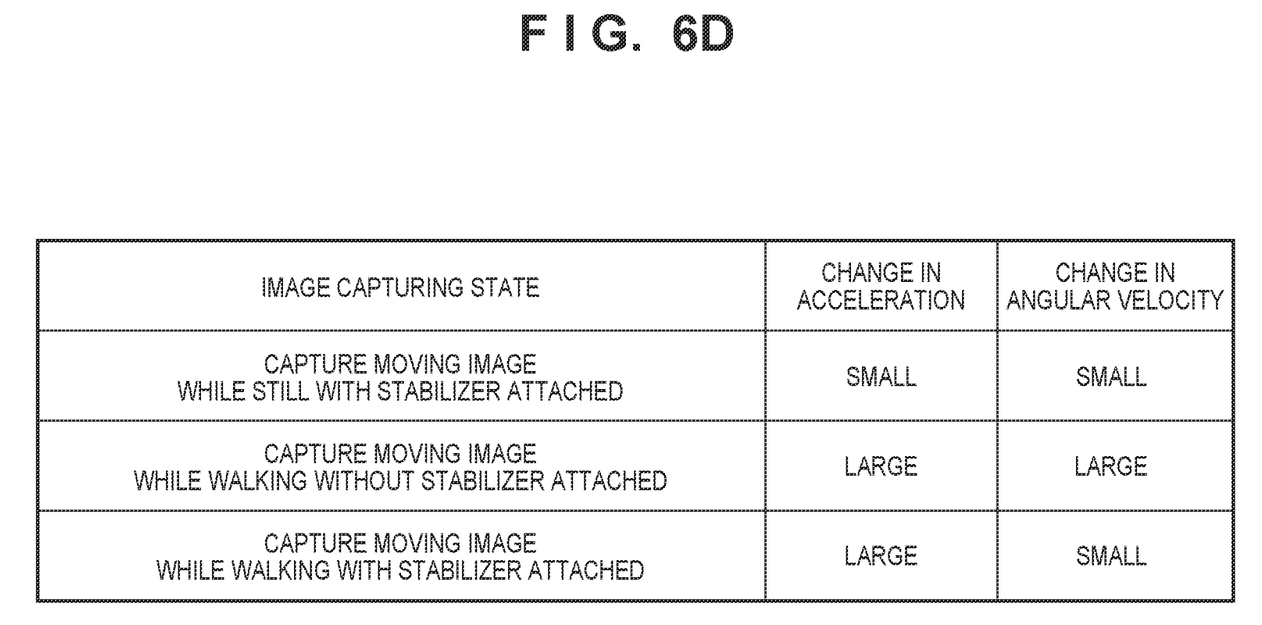

From these results, a relative relationship between the acceleration signal and the angular velocity signal in the gravitational direction of the camera body 100 when the stabilizer is attached to the camera body 100 and a moving image is captured while still and when the stabilizer is attached to the camera body 100 and a moving image is captured while walking is as illustrated in FIG. 6D. From FIG. 6D, it can be seen that, when a moving image is captured while walking with the stabilizer attached, the change in the angular velocity signal in the gravitational direction is relatively small, and the change in the acceleration signal in the gravitational direction is relatively large (a predetermined condition is satisfied).

Using the results illustrated in FIG. 6D, it is determined whether a moving image is being captured while walking with a stabilizer attached to the camera body 100. That is, when the change in the angular velocity signal in the gravitational direction of the camera body 100 is small and the change in the acceleration signal in the gravitational direction is large, it is determined that the camera body 100 is mounted on a stabilizer and an image being captured while walking. In that case, the camera microcomputer 104 switches the operation mode of the orientation angle calculation unit 108 to the stabilizer attached mode and calculates the orientation angle. In this way, the operation mode is dynamically changed and the orientation angle is calculated.

Figure 7:
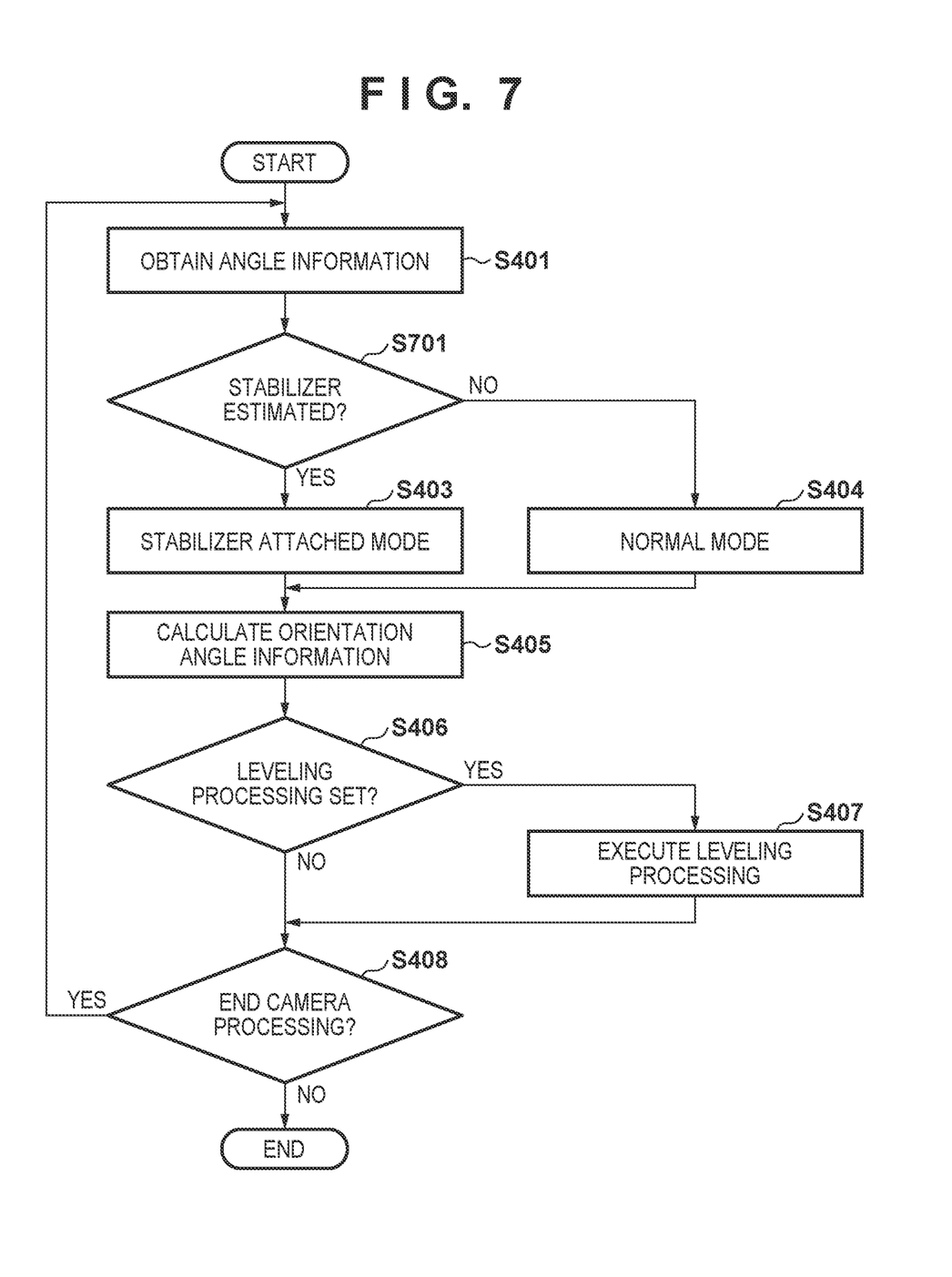
FIG. 7 is a flowchart for explaining the operation of leveling processing according to the second embodiment.

Next, the processing of step S701 performed by the camera microcomputer 104 in the present embodiment will be described with reference to a flowchart indicated in FIG. 7. In the flowchart of FIG. 7, the respective processes are the same as those of FIG. 4, except for the processing of step S701.

In step S701, the camera microcomputer 104 determines which of the angle calculation modes of the orientation angle calculation unit 108 is to be set based on a result of determination as to whether a stabilizer is attached, which is estimated by the stabilizer estimation unit 501, and whether walking moving image capturing is being performed. When switching to the stabilizer attached mode, step S403 is executed. When not switching to the stabilizer attached mode and performing the processing of the normal mode, step S404 is executed.

As described above, according to the present embodiment, even if the user uses a stabilizer for walking moving image capturing, a complicated operation is not necessary, and it is possible to easily capture a good image in which the levelness of the image is maintained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-149544, filed Sep. 20, 2022, which is hereby incorporated by reference herein in its entirety.

What is claimed is:

1. An image capturing apparatus operable to obtain an image by capturing a subject image, the apparatus comprising:
   at least one processor or circuit configured to function as:
   an orientation angle calculation unit configured to calculate an orientation angle of the image capturing apparatus;
   a correction unit configured to perform correction based on the orientation angle of the image capturing apparatus so as to maintain a levelness of the image;
   an acceleration information obtaining unit configured to obtain information on acceleration of the image capturing apparatus; and
   an angular velocity information obtaining unit configured to obtain information on angular velocity of the image capturing apparatus,
   wherein the orientation angle calculation unit changes a method of calculating the orientation angle between a first state in which walking moving image capturing is performed with a vibration suppression mechanism configured to suppress a vibration of the image capturing apparatus attached to the image capturing apparatus and a second state other than the first state,
   wherein the orientation angle calculation unit calculates the orientation angle of the image capturing apparatus using the acceleration information and the angular velocity information, and
   wherein the orientation angle calculation unit changes a combination ratio of the acceleration information and the angular velocity information between the first state and the second state and calculates the orientation angle of the image capturing apparatus.

2. The image capturing apparatus according to claim 1, wherein the at least one processor or circuit is configured to further function as:

a vibration state obtaining unit configured to obtain a vibration state of the image capturing apparatus based on the acceleration information or the angular velocity information,
  wherein in the second state, the orientation angle calculation unit changes a combination ratio of the acceleration information and the angular velocity information according to the vibration state of the image capturing apparatus and calculates the orientation angle of the image capturing apparatus.

3. The image capturing apparatus according to claim 2, wherein the orientation angle calculation unit calculates the orientation angle of the image capturing apparatus using either the acceleration information or the angular velocity information according to the vibration state of the image capturing apparatus.

4. The image capturing apparatus according to claim 1, wherein the correction unit decides whether to perform the correction according to whether the image capturing apparatus is in the first state or the second state.

5. The image capturing apparatus according to claim 1, further comprising: a movement device configured to move an image capturing element with respect to an optical axis of an image capturing optical system, wherein the correction unit performs the correction by moving the image capturing element.

6. The image capturing apparatus according to claim 1, wherein the at least one processor or circuit is configured to further function as:
  a geometric deformation unit configured to perform geometric deformation on the image,
  wherein the correction unit performs the correction by the geometric deformation.

7. The image capturing apparatus according to claim 1, wherein the at least one processor or circuit is configured to further function as:
  a setting unit by which a user sets that the vibration suppression mechanism has been attached to the image capturing apparatus.

8. The image capturing apparatus according to claim 1, wherein the at least one processor or circuit is configured to further function as:
  a communication unit configured to notify, by communication, that the vibration suppression mechanism has been attached to the image capturing apparatus.

9. The image capturing apparatus according to claim 1, wherein the user sets in the image capturing apparatus that the image capturing apparatus is in the first state.

10. The image capturing apparatus according to claim 1, wherein the at least one processor or circuit is configured to further function as:
  an estimation unit configured to estimate whether the image capturing apparatus is in the first state or the second state based on the acceleration information and the angular velocity information.

11. The image capturing apparatus according to claim 1, wherein the at least one processor or circuit is configured to further function as:
  a correction angle calculation unit configured to calculate a correction angle of an orientation of the image capturing apparatus using the acceleration information and the angular velocity information.

12. A method of controlling an image capturing apparatus operable to obtain an image by capturing a subject image, the method comprising:
  calculating an orientation angle of the image capturing apparatus;
  performing correction based on the orientation angle of the image capturing apparatus so as to maintain a levelness of the image;
  obtaining information on acceleration of the image capturing apparatus; and
  obtaining information on angular velocity of the image capturing apparatus,
  wherein in the calculating of the orientation angle, a method of calculating the orientation angle is changed between a first state in which walking moving image capturing is performed with a vibration suppression mechanism configured to suppress a vibration of the image capturing apparatus attached to the image capturing apparatus and a second state other than the first state,
  wherein calculating the orientation angle of the image capturing apparatus using the acceleration information and the angular velocity information, and
  wherein changing a combination ratio of the acceleration information and the angular velocity information between the first state and the second state and calculates the orientation angle of the image capturing apparatus.

13. A non-transitory computer-readable storage medium storing a program for causing a computer to execute each step of a method of controlling an image capturing apparatus operable to obtain an image by capturing a subject image, the method comprising:
  calculating an orientation angle of the image capturing apparatus;
  performing correction based on the orientation angle of the image capturing apparatus so as to maintain a levelness of the image;
  obtaining information on acceleration of the image capturing apparatus; and
  obtaining information on angular velocity of the image capturing apparatus,
  wherein in the calculating of the orientation angle, a method of calculating the orientation angle is changed between a first state in which walking moving image capturing is performed with a vibration suppression mechanism configured to suppress a vibration of the image capturing apparatus attached to the image capturing apparatus and a second state other than the first state,
  wherein calculating the orientation angle of the image capturing apparatus using the acceleration information and the angular velocity information, and
  wherein changing a combination ratio of the acceleration information and the angular velocity information between the first state and the second state and calculates the orientation angle of the image capturing apparatus.

14. An image capturing apparatus operable to obtain an image by capturing a subject image, the apparatus comprising:
  at least one processor or circuit configured to function as:
  an orientation angle calculation unit configured to calculate an orientation angle of the image capturing apparatus;
  a correction unit configured to perform correction based on the orientation angle of the image capturing apparatus so as to maintain a levelness of the image;
  an acceleration information obtaining unit configured to obtain information on acceleration of the image capturing apparatus;

an angular velocity information obtaining unit configured to obtain information on angular velocity of the image capturing apparatus; and a vibration state obtaining unit configured to obtain a vibration state of the image capturing apparatus based on the acceleration information or the angular velocity information, wherein the orientation angle calculation unit changes a method of calculating the orientation angle between a first state in which walking moving image capturing is performed with a vibration suppression mechanism configured to suppress a vibration of the image capturing apparatus attached to the image capturing apparatus and a second state other than the first state, wherein the orientation angle calculation unit calculates the orientation angle of the image capturing apparatus using the acceleration information and the angular velocity information, and wherein in the second state, the orientation angle calculation unit changes a combination ratio of the acceleration information and the angular velocity information according to the vibration state of the image capturing apparatus and calculates the orientation angle of the image capturing apparatus.

15. An image capturing apparatus operable to obtain an image by capturing a subject image, the apparatus comprising:

at least one processor or circuit configured to function as:

an orientation angle calculation unit configured to calculate an orientation angle of the image capturing apparatus; and a correction unit configured to perform correction based on the orientation angle of the image capturing apparatus so as to maintain a levelness of the image, wherein the orientation angle calculation unit changes a method of calculating the orientation angle between a first state in which walking moving image capturing is performed with a vibration suppression mechanism configured to suppress a vibration of the image capturing apparatus attached to the image capturing apparatus and a second state other than the first state, and wherein the correction unit decides whether to perform the correction according to whether the image capturing apparatus is in the first state or the second state.

16. An image capturing apparatus operable to obtain an image by capturing a subject image, the apparatus comprising:

at least one processor or circuit configured to function as:

an orientation angle calculation unit configured to calculate an orientation angle of the image capturing apparatus; and a correction unit configured to perform correction based on the orientation angle of the image capturing apparatus so as to maintain a levelness of the image;

an acceleration information obtaining unit configured to obtain information on acceleration of the image capturing apparatus;

an angular velocity information obtaining unit configured to obtain information on angular velocity of the image capturing apparatus, wherein the orientation angle calculation unit changes a method of calculating the orientation angle between a first state in which walking moving image capturing is performed with a vibration suppression mechanism configured to suppress a vibration of the image capturing apparatus attached to the image capturing apparatus and a second state other than the first state, wherein the orientation angle calculation unit calculates the orientation angle of the image capturing apparatus using the acceleration information and the angular velocity information, and wherein whether the image capturing apparatus is in the first state or the second state is estimated based on the acceleration information and the angular velocity information.

* * * * *